United States Patent [19]

Bartlett

[11] 4,117,268
[45] Sep. 26, 1978

[54] DIGITAL DIRECT RESPONSE SWITCHING SYSTEM

[75] Inventor: William F. Bartlett, Rochester, N.Y.

[73] Assignee: Stromberg-Carlson Corporation, Tampa, Fla.

[21] Appl. No.: 675,337

[22] Filed: Apr. 9, 1976

[51] Int. Cl.² .......................... H04Q 11/04; H04J 1/14
[52] U.S. Cl. .......................... 179/15 AT; 179/15 BY
[58] Field of Search ....... 179/15 AT, 15 BY, 18 AD, 179/18 R, 99

[56] References Cited

U.S. PATENT DOCUMENTS

| | | | |
|---|---|---|---|
| 2,802,057 | 8/1957 | Ward | 179/15 AT |
| 2,827,516 | 3/1958 | Morris | 179/15 AT |
| 2,928,899 | 3/1960 | Flood et al. | 179/15 AT |
| 2,988,601 | 6/1961 | Brightman | 179/15 AT |
| 3,860,761 | 1/1975 | O'Neill, Jr. | 179/18 J |
| 3,922,495 | 11/1975 | Donohoe | 179/15 BY |
| 4,007,334 | 2/1977 | McDonald | 179/15 AT |

*Primary Examiner*—Thomas W. Brown
*Attorney, Agent, or Firm*—Donald R. Antonelli; Michael F. Oglo

[57] ABSTRACT

An electronic equivalent of an X-Y switch is provided using time division multiplex techniques. The basic switch includes a multiplexing section and a control section, the control section responding to signalling information received on the multiplex line including dialing impulses to determine each successive digit as it is dialed for controlling the steering of voice and signaling information through the multiplexing section to an output of the switch designated by the received digit on one of a plurality of free levels determined by a selected time slot. Thus, a switch having plural outputs with plural levels on each output electronically operates in the manner of the known X-Y switch but with reduced physical size and lower maintenance requirements.

49 Claims, 9 Drawing Figures

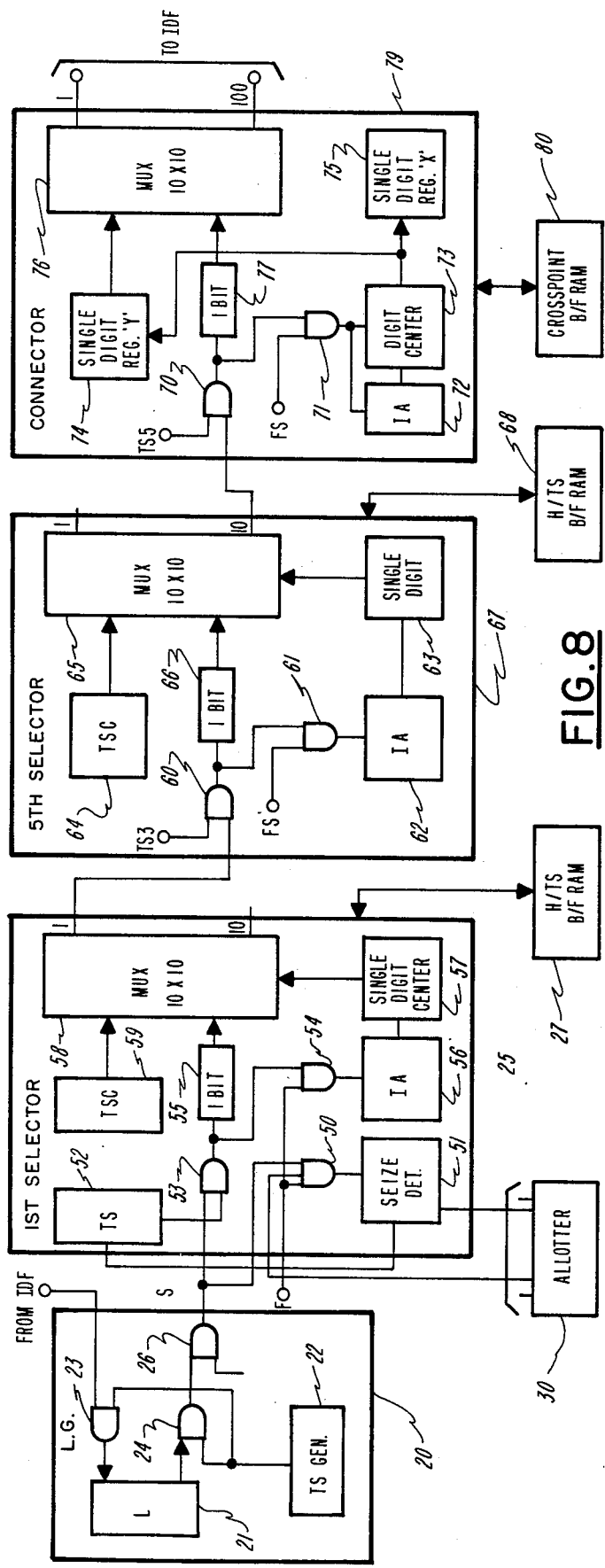
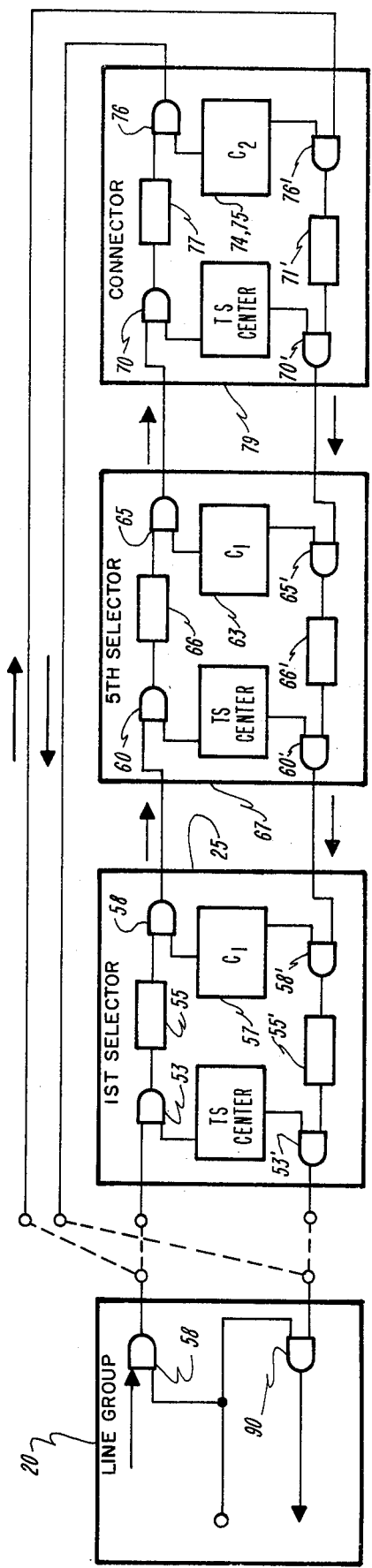
FIG. 8
FIG. 9

DIGITAL DIRECT RESPONSE SWITCHING SYSTEM

The present invention relates in general to telephone systems, and more particularly to an electronic switching system which is the equivalent of a step-by-step switching system, such as the system sold under the trademark "X-Y" which is owned and registered by the assignee of the present invention.

For many years, the X-Y switching system has been a basic switching system for use in central exchange switching, and its popularity has increased even with the advent of electronic systems due to its inherently advantageous features. Indeed, the X-Y switching system has been desirable since it is a very economic system, especially for small office use, in addition to the fact that it is very highly modular, easy to maintain and is easy to increase in size so that its growth is effectively unlimited. In addition, it has proven over the years to be very reliable and is sufficiently basic to provide ease of maintenance.

With all of its inherent advantages, the advances in technology in the industry have finally dictated requirements for minimum space and maintenance as well as special features requiring common control adaptation which the X-Y switching system cannot meet. Accordingly, the time has come for a direct response switching system which provides (1) less cost per line than the X-Y switching system over the entire range, and (2) retains the modularity, reliability, ease of maintenance and ease of addition which are inherent in the X-Y system. Thus, if such a replacement system could be provided using present-day technology to reduce the physical size of the system, minimize the preventive maintenance, and make common control adaptation less expensive, the inherent advantages of the X-Y switching system could be retained while also providing those additional advantages available through state-of-the-art technology.

It is, therefore, an object of the present invention to provide a digital direct response switching system which is highly modular, easy to maintain, reliable and of reduced physical size.

It is a further object of the present invention to provide a digital direct response switching system using state-of-the-art technology which retains the basic inherent advantages of the X-Y switching system while providing less cost per line over the entire range of size of the system.

It is a further object of the present invention to provide a digital direct response switching system which is amenable to common control adaptation at low cost.

It is still another object of the present invention to provide a digital direct response switching system which retains the unlimited growth capability of the X-Y switching system as well as the ease of maintenance and reliability inherent in the prior art system.

The present invention basically provides a large scale integrated (LSI) switching circuit which is functionally equivalent to the basic X-Y switch. The basic switch uses time division multiplex techniques and incorporates direct-response control so that the dial pulses drive the switch directly. In this way, common control adaptation in the system can be provided as an optional feature.

A basic switch forms a fundamental building block from which are derived all the other system elements, such as line finders, first selectors, fifth selectors, connectors, etc. Using this basic building block approach, all of the inherent architectural advantages of the known X-Y switch including high modularity and unlimited growth potential can be retained.

The fundamental building block is formed on a single LSI chip and is basically a time division multiplex switch which is fed with a modulation signal including both voice and supervision. The supervision is extracted into a control section which performs the function of analyzing the supervision to determine the digit that has been dialed at the particular stage. The dialed digit in turn controls a multiplexer which then switches the voice portion of the modulation signal through the switch to monitor the multiplicity of outputs therefrom.

Any well-known type of modulation may be employed within the system including variable slope delta modulation, pulse code modulation, etc. In addition, either in-band or out-band signaling can be employed. In addition, the system may employ either a fixed slot array or the time slot can be floating. Using the fundamental building block, a digital direct response switching system can be achieved which has all of the inherent advantages of the prior art step switching systems, while providing additional advantages achieved through the use of state-of-the-art techniques.

These and other objects, features, and advantages of the present invention will become more apparent from the following detailed description of the present invention, when taken in conjunction with the accompanying drawings, which illustrate one exemplary embodiment of the present invention, and wherein:

FIG. 8 is a schematic block diagram of the basic switch path from the line group through the first selector, fifth selector, and connector; and FIG. 9 is a schematic diagram of the typical four-wire switch path in the exemplary system in accordance with the present invention.

An exemplary system embodying the features of the present invention will now be described; however, as will become apparent from this disclosure, various details of the exemplary embodiment, such as the number of lines employed, the type of modulation selected, the use of in-band or out-band signaling and the basic modulation scheme employed are matters of choice insofar as the basic concepts of the present invention are concerned. Thus, it should be apparent that these parameters may be selectively employed in accordance with the basic concepts of the present invention.

Figure 1:
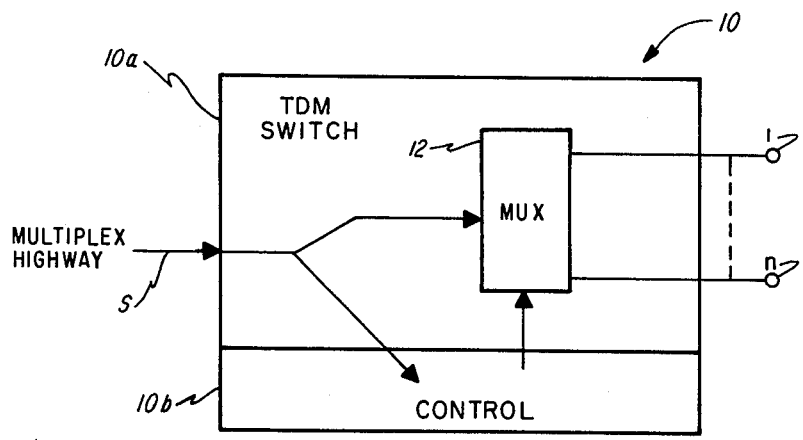
FIG. 1 is a schematic diagram of a switch forming a fundamental building block in accordance with the present invention.

FIG. 1 schematically illustrates a time division multiplex switch 10 which forms the fundamental building blocks for the digital direct response switching system of the present invention. The switch 10 may be formed by large scale integration on a single semiconductor chip thereby reducing the costs and space requirements of the overall system while maintaining high reliability and reducing the maintenance requirements of the switching system.

Basically, the switch 10 is a time division multiplex switch which is fed on input line S with a variable slope delta modulation signal, for example, which includes both voice and supervision. The supervision is extracted in a control section 10b which performs the function of analyzing the supervision to determine the digit that has been dialed at this stage. The dialed digit in turn controls a multiplexer section 10a which then switches the voice and data portions of the variable slope delta modulation through the switch to select one of the multiplicity of outputs 1 through n, for example, ten outputs as provided in the conventional X-Y switch.

Figure 2:
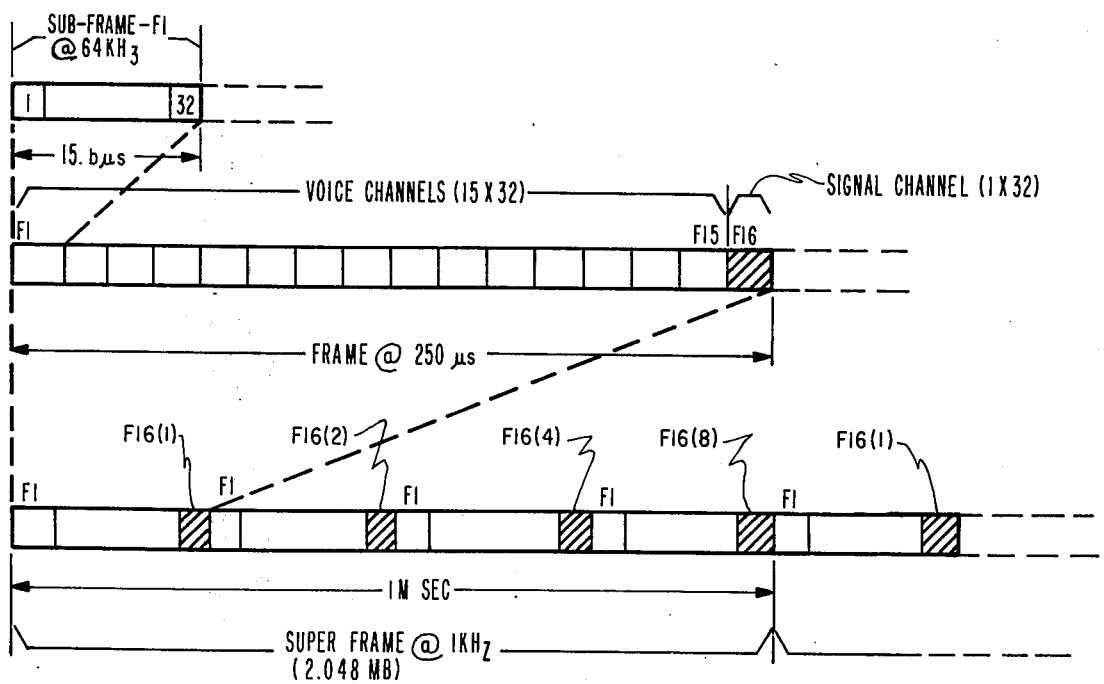
FIG. 2 is a schematic diagram illustrating the time slot multiplexing arrangement which may be used for the exemplary system in accordance with the present invention disclosed in this application.
Figure 3:
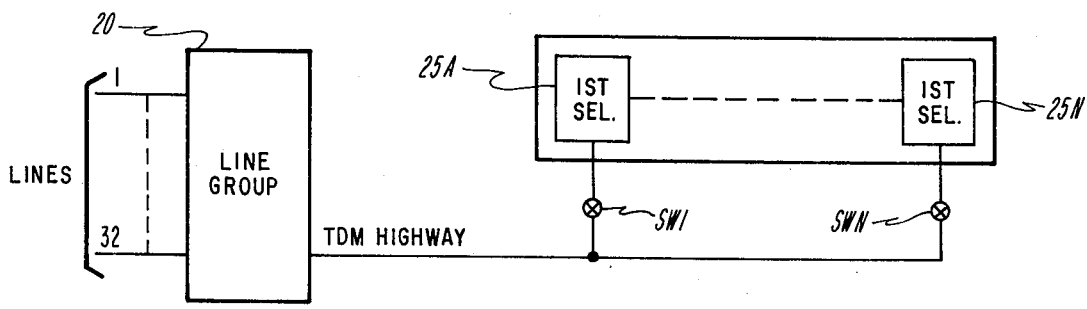
FIG. 3 is a schematic diagram of a time division multiplex line group.

Line access to the system is accomplished by providing a time division multiplex line group wherein a number of lines are multiplexed onto a single highway and given availability to an appropriate one of a number of first selectors. As seen in FIG. 3, a plurality of subscriber lines 1-32 are applied to the inputs of a line group 20 having a single output in the form of a time division multiplex highway TDM. The line group 20 is formed by a conventional data switch or coder which multiplexes the voice and supervision for each incoming line and applies it to the time division multiplex highway in a manner to be described in connection with FIG. 2. The time division multiplex highway is connected to a number of first selectors 25a through 25n via respective switches SW1 through SWn, respectively. By suitably selecting an appropriate one of the switches SW1 through SWn, during a selected time slot, the voice and supervision from a particular line can then be steered to a particular first selector.

With 32 lines incoming to a particular line group 20, the multiplex system will employ 32 channels with one channel assigned per line. Thus, a subframe as seen in FIG. 2 will consist of thirty-two time slots recurring at a frame rate of 64 kHz. The line group 20 will therefore employ a hybrid encoder-decoder per line.

Looking more particularly to FIG. 2, the 64 kHz frame has a duration of 15.6 microseconds and is subdivided into 32 time slot positions each corresponding to a particular line. Sixteen subframes of 15.6 microseconds each are then combined to form a frame of 250 microseconds in which the first 15 subframes are dedicated to voice samples and the 16th subframe is dedicated as a signaling channel, again one per line. Thus, in a single frame there will be fifteen voice samples for every line and a single signaling channel for each line.

A frame is repeated four times to form a superframe having a repetition rate of 1 kHz and a duration of 1 millisecond. As seen in FIG. 2, in the superframe the supervision provided in the signaling channel will consist of four samples for each line repeating at a 1 millisecond rate. If these samples are binary encoded, it can be assumed that the equivalent of 16 sleeve samples from every line are available. Thus, a 16-stage signaling channel is available in the control system at a 1 kHz repetition rate, which is clearly ample for supervision and line loops, including digit analysis.

As indicated in connection with FIG. 3, the successive superframes of multiplexed voice and supervisory information provided to the time division multiplex highway are suitably steered by control of the switches SW1 through SWn so that voice and signaling information from a respective line is steered to a selected one of the first selectors 25a through 25n. This selecting function is performed by an allotter which assigns a particular line to a particular first selector.

Figure 4:
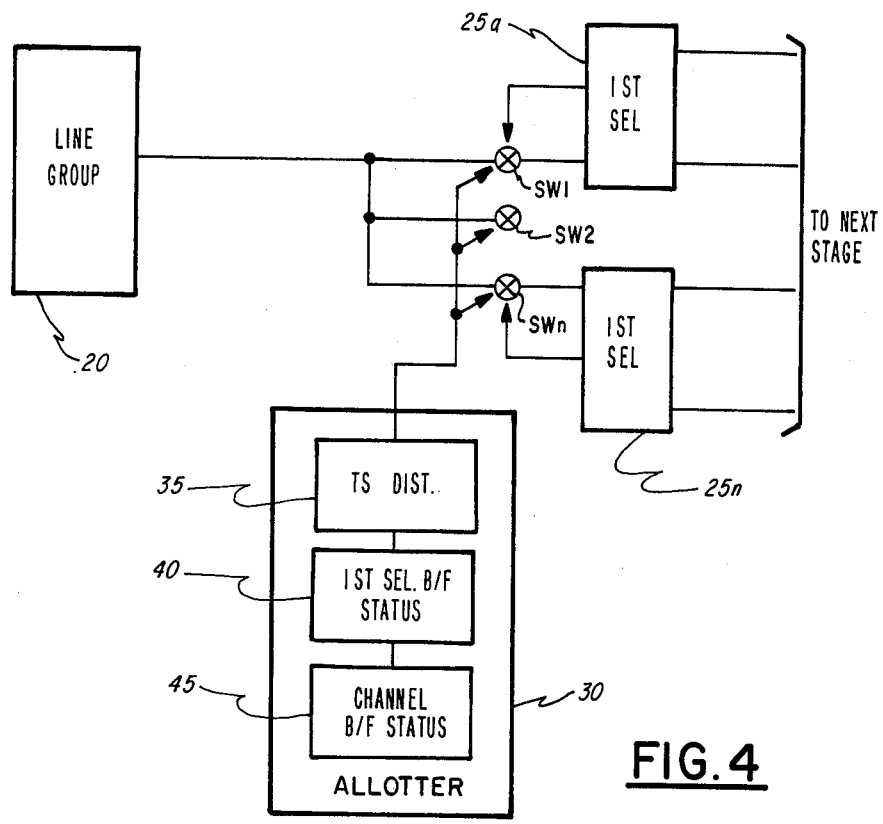
FIG. 4 is a schematic block diagram illustrating details of the allotter and first selector stage of the system in accordance with the present invention.

In FIG. 4 it is seen that the allotter 30 is made up of a channel busy-free status circuit 45 which stores the busy-free condition of each of the lines connected to the line group 20 and thereby is capable of providing information as to which of the channels for time slots 1 through 32 of each subframe are already associated with a particular first selector. The allotter 30 also includes a first selector busy-free status circuit 40 which maintains a record of which of the first selectors 25a through 25n are busy or free. A time slot distributor 35 then responds to the channel busy-free information received from the circuit 45 and the first selector busy-free information received from the circuit 40 to assign a free channel time slot to a free first selector when a communication connection is to be initiated in the circuit.

Thus, the allotter has the information as to which first selectors are free or busy, and which channels are free and busy so that it is able to assign a first selector to a free channel. The selector has built into it, as will be described in greater detail hereinafter, the ability to detect seizure, and upon detection of seizure, the first selector assumes the time slot distribution to its own input gate. Upon being assigned, the first selector also updates the allotter busy free status circuit 40 to show that it is now busy and it also updates the channel busy-free status circuit 45 to show the channel on which the information is being received. Now the line finder has the knowledge that the particular selector has become busy and that a particular time slot has been seized, and it therefore updates its own memory. It then advises the allotter to seek a new first selector to once again repeat the process.

Looking again to FIG. 4, as multiplexed data is received on the time division multiplex highway from the line group 20, the time slot associated with calls already in progress are automatically steered to their assigned first selector through the appropriate one of the gates SW1 through SWn under control of the assigned first selector. At the same time, the allotter 30 will operate the input gate of one of the free first selectors during the time slot of each free channel waiting for seizure by one of the lines requesting service. As soon as this first selector detects receipt of information through its input gate, it stores the identification of the channel so that it may assume further control over its own input gate and then updates the information in the allotter to indicate its busy condition and the channel involved. The allotter then chooses another free selector and in the same manner as already described, operates the input gate of that first selector during the time slot of each remaining free channel so as to await another line requesting service.

For the selector to be equivalent to an X-Y switch it must perform several functions. First of all, it must extract the signaling information from the signaling channel (F16) associated with the loop relay status during each frame. It must analyze this information, recognize dial impulses and interdigital pause conditions, and subsequently count and store a single complete digit. Once this has been done, the selector must do the equivalent of stepping the switch in the X direction. In this regard it must select one of ten output levels using the weight of that digit as the selection. Thus, it must equate the wiping across the bank on the X-Y switch, and in order to do that, it must utilize a common interstage memory showing the busy and free status of the respective positions on the bank so as to be able to select the free one of ten time slots available to that common level from the memory. The selector must then store the selected time slot identity in the selector and regenerate it at a frequency of 64 kHz. Then, the selector time slot identity must be marked busy in the memory so that it cannot be picked up again. The selector then steers the voice channel and signaling channel bits at 64 kHz from the input to the switch, demultiplexes the information and sends it out on the selected level.

Figure 5:
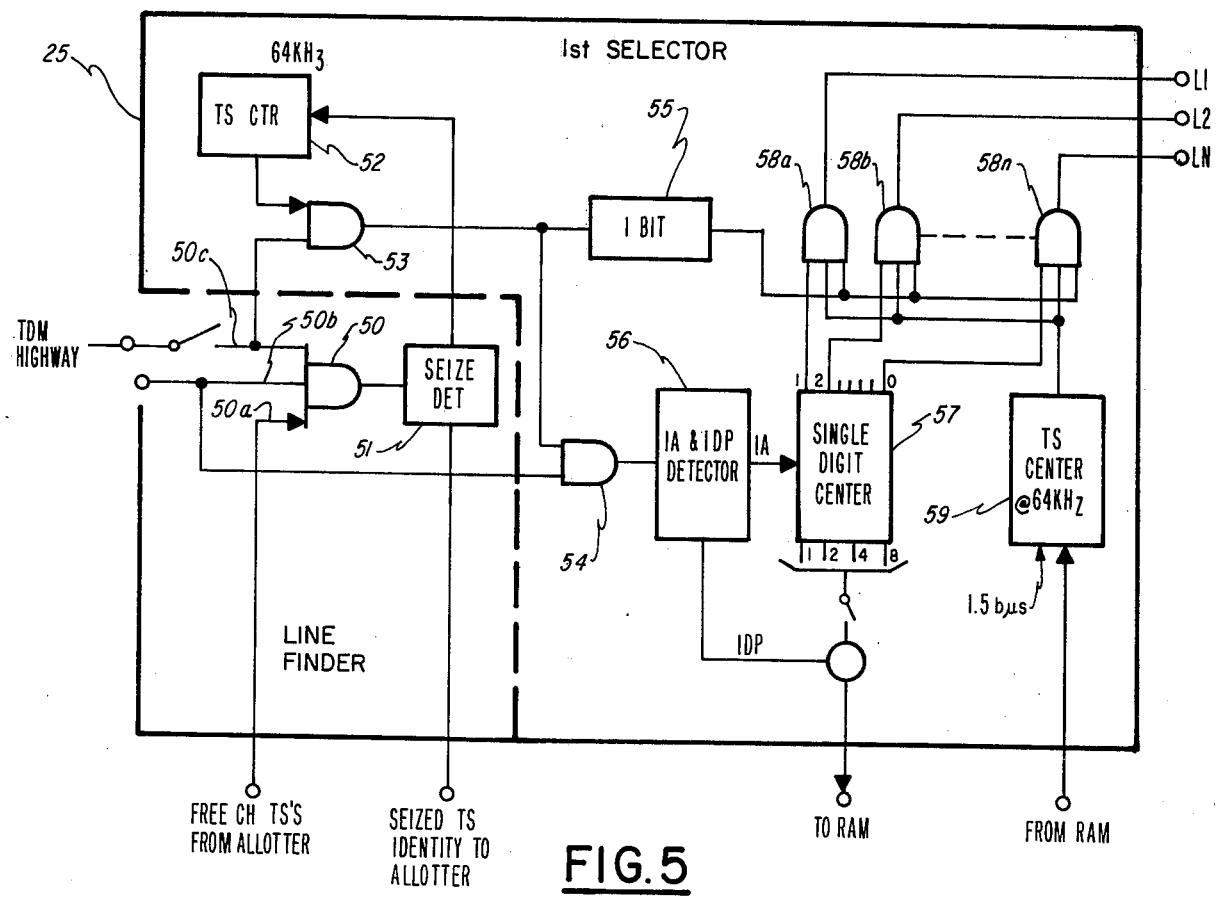
FIG. 5 is a schematic diagram of a typical first selector.

FIG. 5 provides a schematic illustration of the first selector and associated line finder. The line finder, which is made up of gate 50 and seize detector 51, may be provided as a common line finder for all of the first selectors of the group; however, it is illustrated in FIG. 5 in connection with a single first selector. The gate 50 of the line finder forms the input gate for the first selector and serves to monitor the signaling channels (F16) in each frame to detect the receipt of a request for service from a line. The gate 50 has three inputs, the input 50a receiving an enabling impulse from the allotter during each time slot assigned to a free channel, the input 50b receiving the 1 kHz multiplex synchronizing signal and the input 50c being connected to the time division multiplex highway.

The gate 50 in the line finder is enabled by the allotter during each time slot assigned to a free channel, i.e., to a channel assigned to a line which has not as yet requested service. Once the allotter chooses a free first selector, it will enable the gate 50 during each such free channel time slot. When a line requests service, signaling information will be received on its time slot during the signaling channel (F16) which will be received from the time division multiplex highway at input 50c to the gate 50. The gate 50 will then be enabled to provide an output to the seize detector 51, which will detect the presence of signaling information and signal the allotter to indicate that it has detected such information. The allotter will then mark the channel time slot busy, the first selector busy and choose another first selector.

The gate 50 is controlled via the lead 50b from the time slot counter so as to be enabled only during the signaling channel (F16), the line finder being utilized only to monitor the signaling information. Thus, the voice information which is received from the time division multiplex highway is applied directly to the first selector.

The information from the time division multiplex highway is applied to one input of the data gate 53, the other input of which is connected to the output of a time slot counter 52. The seize detector 51 enables the time slot counter 52 upon detecting signaling information at the time the first selector is seized. The time slot counter 52 has a frequency of 64 kHz and thereby enables the gate 53 each 15.6 microseconds at the time of receipt of the seized channel.

The information received on the seized channel is applied through gate 53 to one input of an impulse gate 54, the other input of which is enabled from the time slot generator in synchronism with receipt of the signaling channel (F16). In this way, the signaling data is separated from the bit stream provided at the output of gate 53 and applied to an impulse analyzer and interdigital pause detector 56 of any conventional configuration, which analyzes the data and identifies the digits and interdigital pauses.

When a dialing impulse is detected by the circuit 56, a signal IA is applied to a single digit counter 57. The impulses are built up in the counter 57 until an interdigital pause is detected by the detector 56, at which time a signal IDP is generated from the detector 56 indicating that a complete digit has been received.

A memory is provided in association with each selector group to store in connection with each selector level the busy or free status of the outputs L1 through Ln from the first selector. The memory is provided in the form of a random access memory RAM. Thus, for a given received digit, the RAM will indicate the busy or free status of each of the ten levels for the particular output line designated by the digit. Each level corresponds to a different time slot which provides for connection to a different fifth selector, in a manner to be described in greater detail hereinafter.

When the signal IDP is generated by the detector 56 indicating detection of an interdigital pause, the signal is forwarded to the RAM along with the digit from the counter 57 to request assignment of a free level on the output assigned to that particular digit. The RAM provides the assignment of the free time slot to the input of time slot counter 59, which operates at a 65 kHz rate providing an output each 1.56 microseconds. Thus, the time slot counter 59 will enable a plurality of AND gates 58a through 58n during one-tenth of the subframe period corresponding to the assigned time slot.

The voice information received at the output of gate 53 is also applied to a one bit stretcher, which stretches the data to the full frame width of 15.6 microseconds in view of the fact that the data is to be remultiplexed in going out of the switch. In this regard, it will be remembered that the first selector is dealing only with a single channel of the 15.6 microsecond subframe so that the data in the single channel can be stretched to the full frame width prior to the remultiplexing operation. The data from the bit stretcher 55 is then applied to the gates 58a through 58n along with the appropriately enabled outputs of the single digit counter 57 and the output of the time slot counter 59 so that the stretched data is then applied to the appropriate output line via a single one of the gates 58a through 58n for a period of 1.56 microseconds.

The first selector illustrated in FIG. 5 provides ten output lines L1 through Ln each having ten levels so as to effectively provide a 100 point selector switch similar to the X-Y switch; however, the number of output lines obviously can be more or less than ten and the number of levels on each line can obviously be more or less than 10. Variation in the number of lines or levels per line can be made merely by adjusting the frequency of the data sample. In addition, since there are two variables on which the selector switch is operated, it is not essential that the switch can be constructed so that the received digit designates a particular level and the memory provides an assignment of a particular line. In this regard, the basic switching scheme has considerable versatility. In this modified arrangement, the RAM would select the particular gate 58a through 58n having an available level corresponding to the received digit. The output of the single digit counter 57 could then be applied to a series of gates selectively enabled during the respective time slot so that the received digit would then select the particular level by enabling one of these gates, the output of which would then be applied to each of the gates 58a through 58n.

Figure 6:
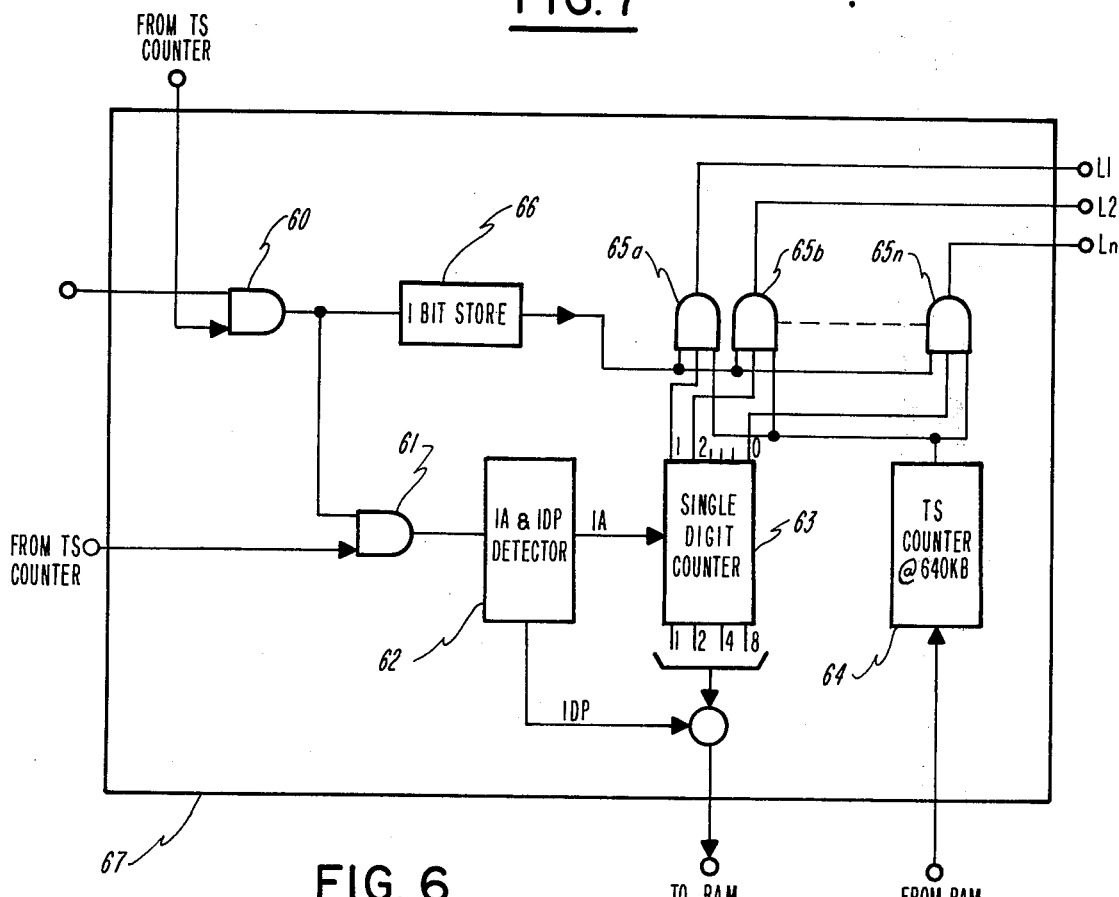
FIG. 6 is a schematic diagram of a typical fifth selector.

FIG. 6 is a schematic diagram of a typical intermediate switching stage, such as the fifth selector having outputs connected to the connector stage. The fifth selector is identical to the first selector except for the fact that the inputs are dedicated to one specific level and one fixed time slot (64 kHz) having a duration of 1.56 microseconds.

Referring to FIG. 6 the input gate 60 receives at one of its inputs information from the fixed level time division multiplex highway, the level selected by the first selector. The gate 60 is enabled from the system time slot generator at a 64 kHz rate for a duration of 1.56 microseconds, as already indicated, so that the connector is responsive only during a dedicated time slot assigned to the selector.

The supervisory information is applied from the output of gate 60 to one input of impulse gate 61, the other input of which is connected to the time slot generator to be enabled at a 1 kHz rate so as to sample only the signal channel (F16) once per superframe. The signal channel information is applied to an impulse analyzer and interdigital pause detector 62 which analyzes the impulses and drives the single digit counter 63 until the interdigital pause is detected. As in the case of the first selector, a random access memory RAM is provided for the fifth selector group to store busy/free conditions concerning the various levels of the output lines L1 through Ln for each fifth selector.

Upon receipt of the digit compiled by the single digit counter 63 and the interdigital pause signal IDP from the detector 62, the RAM will select a free level on the output line designated by the state of the counter 63 and forward the identification of this level to the time slot counter 64. Thus, a single one of the gates 65a through 65n will be selected by the single digit counter 63, depending upon the digit detected, and the time slot counter 64 will enable that selected gate repetitively during the assigned level as received from the RAM.

The information signal from the output of gate 60 is applied to the one bit store 66 where it is stretched to the full 15.6 microsecond width and then applied to the gates 65a through 65n so as to be applied through the single enabled gate to the output line corresponding to the detected digit on the level thereof selected by the RAM. In the example described herein, each of the ten output lines is provided with ten levels so as to basically correspond to the 100 point X-Y switch. The outputs from the fifth selector group are connected to the connector stage.

Figure 7:
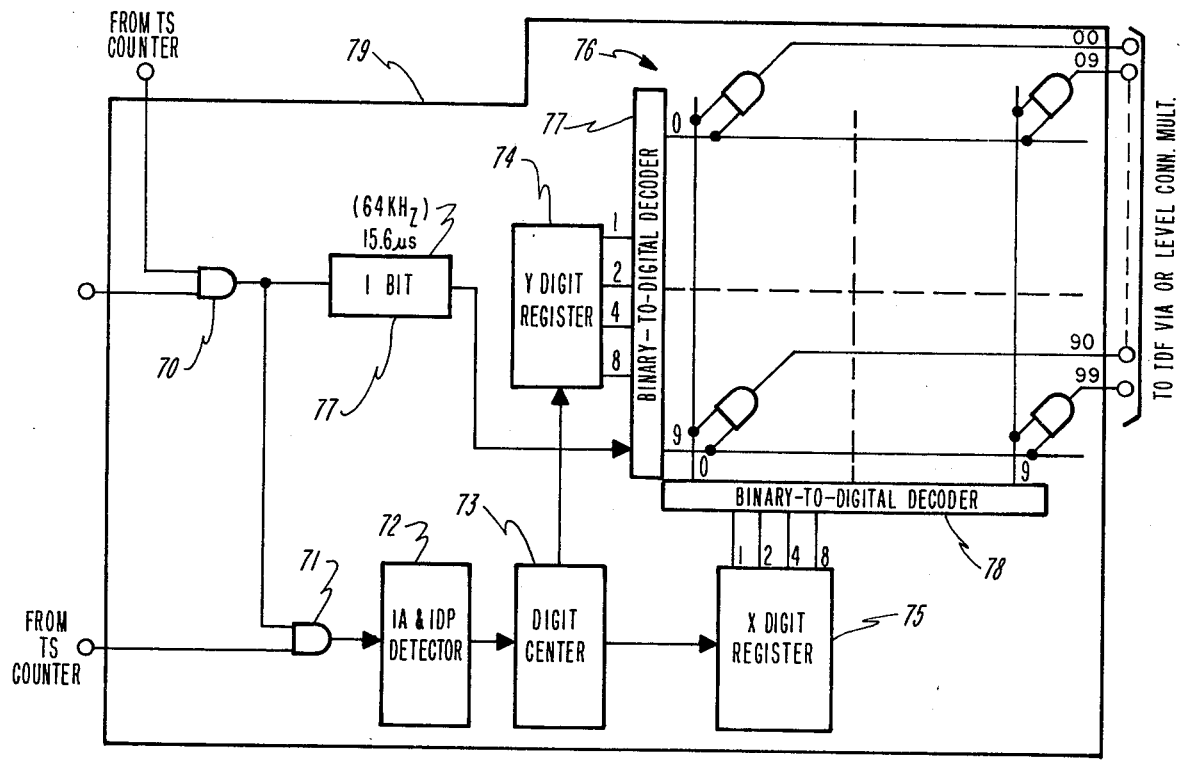
FIG. 7 is a schematic diagram of a typical connector.

FIG. 7 illustrates a basic connector circuit in accordance with the present invention. Like the fifth selector circuit, the input of the connector is dedicated to a single level and a single selected time slot; however, while the first selector and fifth selector were responsive to the first and second dialed digits, respectively, the connector circuit will be responsive to two dialed digits, i.e., the third and fourth dialed digits.

The input gate 70 of the connector has one input which is connected to the fixed level time division multiplex highway extending from the fifth selector stage. The gate 70 is enabled at a rate of 64 kHz for a duration of 1.56 microseconds at the time slot dedicated to the particular connector circuit. The impulse gate 71 receives the output from gate 70 and is enabled by timing signals from the time slot generator at a rate of 1 kHz so as to sample only the signal channel (F16) one time during each superframe. In this way, the supervisory information from the fixed level time division multiplex highway is applied to the impulse analyzer and interdigital pulse detector 72 which analyzes the impulses and drives the digit counter 73 in response thereto.

Since the connector must be responsive to a pair of digits, the digit counter will first drive the X digit register 74 to store the first digit therein and then drive the Y digit register 75 to store the second digit therein. This is accomplished by a suitable gating circuit (not shown) which is responsive to the interdigital pause signal generated by the detector 72 to provide for connection of the digit counter 73 first to the X digit register 74 until the first interdigital pause is detected and then switch the connection from the digit counter 73 to the Y digit register 75 until the second interdigit pause signal is generated by the detector 72, at which time the digit counter 73 is again switched back to the X digit register 74.

The registers 74 and 75 are connected to a crosspoint matrix 76 and serve to enable one crosspoint thereof selected by the digit stored in each register. In this regard, the registers 74 and 75 store the binary value of the received digits and apply these to respective binary-to-digital decoder 77 and 78, the outputs of which are connected to the crosspoint matrix 76.

Each crosspoint of the matrix 76 is multiplied to its counterpoint crosspoint and other connectors. Obviously, the same destination must be accessible from many connectors so that they are effectively ORed together. The information received from the fixed level time division highway is applied from the output of gate 70 through a one bit store 77 where it is stretched to the full 15.6 microsecond width and then applied to the crosspoint matrix 76. The matrix 76 applies this information to a single one of the 100 outputs therefrom, each of which is connected through an intermediate distribution frame (not shown) to a selected line circuit. Signal distribution via the intermediate distribution frame then takes place at a 64 kHz rate. It will be noted that there is no level selection in the connector so that the data is forwarded to the intermediate distribution frame at the full 15.6 microsecond width.

The basic operation of the switch system in accordance with the present invention will be described in connection with FIG. 8. It will be assumed that a seven digit number has been dialed and that as is typical, the first three digits are absorbed in the local first selector, a function that is normally performed by the first selectors in the case of a local call where it is unnecessary to drive the switches with the office code. FIG. 8 represents a sample switch path for a local call involving only the first selector, fifth selector, and a connector. The first digit of the four digit number drives the first selector, the second digit drives the fifth selector, and the third and four digits drive the connector, in the manner already described.

The line group 20 is illustrated as including a line circuit 21, a time slot generator 22 providing time slot distribution for the line group and gates 23, 24, and 26 which control the application of data from the line circuit to the switching system via gates 24 and 26, and from the intermediate distribution frame via gate 23 to the line circuit.

Information in the form of voice and signaling data is applied to the two mHz time division multiplex highway S to the first selector stage, and an available first selector 25 which has been chosen by the allotter 30 will receive data for the given line circuit 21 during the time slot associated therewith, upon detection of seizure of the first selector by the seize detector 51 receiving signal channel information via gate 50. The seize detector 51 signals the allotter 30 to indicate that the selector has been seized and the allotter 30 then marks that selector busy along with the time slot which is being generated at that time and which designates the line circuit requesting service. Information from the line circuit is then received via gate 53, stretched in the one bit store 55 and applied to the multiplex gates 58. The signaling information is received from the output of gate 53 and applied through gate 54 to the impulse analyzer 56, which drives the single digit counter 57 until an interdigital pause is detected. When the first digit has been received and stored in the single digit counter 57, the RAM 27 will select an available level on the output line designated by the stored digit and forward this information to the selector to sample the stretched voice and signaling information coming through this switch onto the appropriate level in the appropriate time slot selected (one of ten time slots on that level).

In this example, information is sampled from output line 1, so that it is assumed that the first digit dialed was a 1. It is also assumed that the level of output line 1 from the first selector which has been chosen by the RAM 27 is level 3, so that the fifth selector which will receive this information is the one dedicated to time slot 3. Thus, the information received from the multiplex highway extending between the first selector stage and the fifth selector stage will be received at one input of gate 60 in the fifth selector 57 which is controlled from the time slot generator by the time slot TS3. Once again, the signaling information obtained at the output of gate 60 is applied through gate 61 to the impulse analyzer 62 which analyzes the impulses and drives the single digit counter 63 until an interdigital pause is detected. At this time, a request is sent to the RAM 68 for a free level at the appropriate output line, and the RAM controls the time slot counter 64 to enable the one of the multiplex gate 65 assigned to the line designated by the received second digit. The sample of the voice and signaling information is stretched by the one bit store 66 and applied this time to output line 0, indicating that the second digit was a 0 and this time during time slot 5. A single connector 79 dedicated to time slot 5 and associated with the output line 0 from the fifth selector 57 will be picked up at this time.

The information from the multiplex bus extending between the fifth selector stage and the connector stage will be received at gate 70 in the connector 79 during time slot 5. The signaling information will be applied through gate 71 to the impulse analyzer 72 which drives the digit counter 73. When the third dialed digit has been received, an interdigital pause will be detected switching the output of the digit counter 73 from the single digit register 74 to the single digit register 75. With the receipt of the second interdigital pause signal from the impulse analyzer 72, gate 80 will be informed that the third and fourth dialed digits are stored in the registers 74 and 75, respectively, and that one of the parallel connected multiplex arrays 76 is to be selected in which the designated crosspoint is not busy. The stretched sample voice and signaling information is then passed out at the full 15.6 microsecond width to one of the 100 outputs from the connector where it is applied to the intermediate distribution frame. From the intermediate distribution frame, the signaling information is then forwarded back to the line group 20 to the appropriate called line circuit.

FIG. 9 schematically illustrates a typical four-wire switch path through the switching network. It will be noted in the figure that only the elements in the direct path from one switching stage to the other are illustrated; however, reference to FIG. 8 will clearly indicate where the corresponding elements are provided and how they are connected in each switching stage.

Information from the called party is applied through the gate 85 in the line group 20 to the time division multiplex highway where it reaches the input gate 53 in the first selector, is applied through the bit stretcher 55 and passes through the multiplex gate 58 to the fifth selector stage. The fifth selector 67 is shown as including the input gate 60, bit stretcher 66 and multiplex gate 55, which provides its output to the connector stage. The connector 79 then carries the information from the input gate 70 through a bit stretcher 77 and the multiplex gate 76 to its output where it is applied through the intermediate distribution frame back to an input of gate 90 in the line group to the called line circuit and will be sampled in its appropriate time slot under control of the time slot generator associated with the line group 20. The reverse path where the called party speaks to the calling party comes in again at the output of gate 85, but is applied through the intermediate distribution frame to an input of the connector 79 at gate 76' where it is passed through the bit stretcher 77' and the multiplex gate 70'. From the connector the information is passed on to the input gate 65' of the fifth selector 67, is bit stretched in the element 56' and passed through multiplex gate 60' to the first selector stage. The first selector receives this information at input gate 58', bit stretches the information at element 55' and passes the information through the multiplex gate 53' to the input to gate 90 in the line group 20 where it is sampled in its appropriate time slot by the calling party. Thus, while the system illustrated in FIG. 8 shows a single direction of communication, in reality, a typical four-wire connection such as provided in FIG. 9 will be utilized to provide two-way communication between the parties. For this purpose, the time slot counters and digit counters in each of the various switching stages will be utilized to control the two switch paths in synchronism during the selected time slot necessary to establish communication between the two parties.

The system as disclosed has many advantages, the principal one of which is the fact that using present-day technology and time division multiplex, the physical size of the system is greatly reduced. For this reason, the number of switches in a bank no longer is subjected to physical constraints. In the known X-Y switching system, and indeed in other similar switching systems such as crossbar, there are a limited number of switches in a bank of switches because the physical size of the system has distinct limits. However, by using integrated circuit technology and time division multiplex, the physical size of the switching system in accordance with the present invention is not only reduced, but the number of wires or connections to each switch are reduced by an order of magnitude as a result of the time division multiplex. Whereas, in the conventional switching system there are a hundred wires coming out of each selector, with the present invention only ten wires with ten time slots on each wire are provided.

It is also quite apparent that the system in accordance with the present invention could be easily adapted to common control and could be connected via a data link to a stored program system to provide centralized control over the system in common with other systems.

While the system described by way of example utilizes inband signaling techniques, it should be apparent from the foregoing detailed description of the present invention that out-band signaling could also be easily provided, if desired. These and other modifications described herein clearly evidence the versatility provided by the basic concept in accordance with the present invention, and therefore, all such modifications and variations are considered to fall within the scope of the present invention.

While there has been shown and described what is at present considered to be the preferred embodiment of the present invention, it is not desired that the invention be limited to the embodiment shown and described, and therefore it is intended that the appended claims will cover all such modifications as fall within the true scope and spirit of the invention.

What is claimed is:

1. A time division multiplex switch for use in a step-by-step type telephone switching system and having a single input terminal for connection to a multiplex highway carrying a plurality of multiplexed channels of information in a recurring time frame, each channel providing information signals and supervisory signals including signals representative of dialing impulses identifying the successive digits of a called subscriber number, and a plurality of output terminals to a selected one of which a designated channel of information is to be applied in accordance with the received dialing impulses representative of a single digit during a selected time slot of said recurring time frame, said switch comprising
   demultiplexing means connected to said input terminal for extracting said designated channel of information from said multiplex highway;
   means for detecting the dialing impulses representative of a single digit in said designated channel received from said demultiplexing means;
   multiplexing means responsive to said detecting means for connecting the output of said demultiplexing means to an output terminal identified by the detected single digit; and
   control means for actuating said multiplexing means during a selected time slot of said recurring time frame.

2. A time division multiplex switch having a single input terminal for connection to a multiplex highway carrying a plurality of multiplexed channels of information in a recurring time frame, each channel providing information signals and supervisory signals including signals representative of dialing impulses, and a plurality of output terminals to a selected one of which a designated channel of information is to be applied in accordance with the received signals representative of dialing impulses during a selected time slot of said recurring time frame, said switch comprising
   demultiplexing means connected to said input terminal for extracting said designated channel of information from said multiplex highway;
   means for detecting the signals representative of dialing impulses in said designated channel received from said demultiplexing means;
   multiplexing means responsive to said detecting means for connecting the output of said demultiplexing means to a selected output terminal identified by the detected signals representative of dialing impulses;
   means connected between the output of said demultiplexing means and the input of said multiplexing means for stretching said designated channel of information to the full width of said time frame; and
   control means for actuating said multiplexing means during a selected time slot of said recurring time frame.

3. A time division multiplex switch as defined in claim 2 wherein said demultiplexing means comprises gating means for connecting said highway to said multiplexing means via said stretching means and means for actuating said gating means repetitively during the time slot of said recurring time frame assigned to said designated channel.

4. A time division multiplex switch as defined in claim 3 wherein said means for actuating said gating means is a counter.

5. A time division multiplex switch having a single input terminal for connection to a multiplex highway carrying a plurality of multiplexed channels of information in a recurring time frame, each channel providing information signals and supervisory signals including signals representative of dialing impulses, and a plurality of output terminals to a selected one of which a designated channel of information is to be applied in accordance with the received signals representative of dialing impulses during a selected time slot of said recurring time frame, said switch comprising
   demultiplexing means connected to said input terminal for extracting said designated channel of information from said multiplex highway;
   means for detecting the signals representative of dialing impulses in said designated channel received from said demultiplexing means;
   multiplexing means responsive to said detecting means for connecting the output of said demultiplexing means to a selected output terminal identified by the detected signals representative of dialing impulses; and
   control means for actuating said multiplexing means during a selected time slot of said recurring time frame,
   wherein said detecting means comprises gating means responsive to the output of said demultiplexing means and a timing signal occurring at the time period during which said supervisory signals for said designated channel are received for extracting said supervisory signals from said designated channel, impulse analyzer means responsive to said gating means for analyzing said supervisory signals and detecting dial pulses and interdigital pauses, and digital counter means responsive to said impulse analyzer means for counting dialing impulses until an interdigital pause is detected.

6. A time division multiplex switch as defined in claim 5 wherein said multiplexing means comprises a plurality of gates, each having its output connected to a respective one of said output terminals, one input of each of said gates being connected in common to the output of said demultiplexing means and a second input of each of said gates being connected to a respective digit output of said digital counter means.

7. A time division multiplex switch as defined in claim 6 wherein said control means comprises selectively settable time slot counter means connected in common to a third input of each of said plurality of gates forming said multiplexing means for enabling said gates during a selected time slot of said recurring time frame.

8. A time division multiplex switch as defined in claim 5, further including means connected between the output of said demultiplexing means and the input of said multiplexing means for stretching said designated channel of information to the full width of said time frame.

9. A time division multiplex switch as defined in claim 8 wherein said multiplexing means comprises a plurality of gates, each having its output connected to a respective one of said output terminals, one input of each of said gates being connected in common to the output of said demultiplexing means and a second input of each of said gates being connected to a respective digit output of said digital counter means.

10. A time division multiplex switch as defined in claim 9 wherein said control means comprises selectively settable time slot counter means connected in common to a third input of each of said plurality of gates forming said multiplexing means for enabling said gates during a selected time slot of said recurring time frame.

11. A time division multiplex switch having a single input terminal for connection to a multiplex highway carrying a plurality of multiplexed channels of information in a recurring time frame, each channel providing information signals and supervisory signals including signals representative of dialing impulses, and a plurality of output terminals to a selected one of which a designated channel of information is to be applied in accordance with the received signals representative of dialing impulses, said switch comprising demultiplexing means connected to said input terminal for extracting said designated channel of information from said multiplex highway;
means for detecting the signals representative of dialing impulses in said designated channel received from said demultiplexing means;
means for storing a pair of successively received digits detected by said detecting means; and
matrix switching means responsive to said pair of digits in said storing means for connecting the output of said demultiplexing means to the one of said output terminals designated by said stored digits.

12. A time division multiplex switch as defined in claim 11, further including means connected between the output of said demultiplexing means and said matrix switching means for stretching said designated channel of information to the full width of said time frame.

13. A time division multiplex switch as defined in claim 12 wherein said demultiplexing means comprises gating means for connecting said highway to said multiplexing means via said stretching means and means for actuating said gating means repetitively during the time slot of said recurring time frame assigned to said designated channel.

14. A time division multiplex switch as defined in claim 13 wherein said means for actuating said gating means is a counter.

15. A time division multiplex switch as defined in claim 11 wherein said detecting means comprises gating means responsive to the output of said demultiplexing means and a timing signal occurring at the time period during which said supervisory signals for said designated channel are received for extracting said supervisory signals from said designated channel, impulse analyzer means responsive to said gating means for analyzing said supervisory signals and detecting dial pulses and interdigital pauses, and digital counter means responsive to said impulse analyzer means for counting dialing impulses until an interdigital pause is detected.

16. A time division multiplex switch as defined in claim 15 wherein said storing means comprises first and second registers responsive to said digital counter means and said impulse analyzer means for the respective digits of said pair of digits as they are sequentially detected.

17. A time division multiplex switch as defined in claim 16 wherein said matrix switching means comprises a coordinate array of crosspoint switches respectively connected to the crosspoints of a plurality of horizontal and vertical lines, said first and second registers controlling said horizontal and vertical lines, respectively, so that the pair of digits stored therein will actuate a single one of said crosspoint switches designated by said pair of digits.

18. A time division multiplex switch as defined in claim 15, further including means connected between the output of said demultiplexing means and said matrix switching means for stretching said designated channel of information to the full width of said time frame.

19. A time division multiplex switch as defined in claim 18 wherein said storing means comprises first and second registers responsive to said digital counter means and said impulse analyzer means for the respective digits of said pair of digits as they are sequentially detected.

20. A time division multiplex switch as defined in claim 19 wherein said matrix switching means comprises a coordinate array of crosspoint switches respectively connected to the crosspoints of a plurality of horizontal and vertical lines, said first and second registers controlling said horizontal and vertical lines, respectively, so that the pair of digits stored therein will actuate a single one of said crosspoint switches designated by said pair of digits.

21. A time division multiplex switch comprising demultiplexing means to be connected to a multiplex highway carrying a plurality of multiplexed channels of information in a recurring time frame for extracting a designated channel of information from said multiplex highway, each channel providing coded information signals and supervisory signals including coded dialing impulses, multiplexing means for applying said designated channel of information to a selected one of a plurality of output terminals identified by the received coded dialing impulses of said designated channel of information during a selected time slot of said recurring time frame, and means connected between the output of said demultiplexing means and the input of said multiplexing means for stretching said designated channel of information to the full width of said time frame.

22. A time division multiplex switch as defined in claim 21, further including means connected to the output of said demultiplexing means for detecting the coded dialing impulses in said designated channel, said multiplexing means being responsive to said detecting means for selecting said one output terminal.

23. A time division multiplex switching system comprising a plurality of selector switches connected to a single time division multiplex highway carrying a plurality of multiplexed channels of information in a recurring time frame, each channel providing information signals and supervisory signals including signals representative of dialing impulses;

(a) each selector switch having an input terminal for connection to said multiplex highway, a plurality of output terminals and means for switching a designated channel of information from said input terminal to a selected one of said output terminals in accordance with the received signals representative of dialing impulses during a selected time slot of said recurring time frame;

(b) allotter means responsive to the busy/free condition of said selector switches for selecting a free selector switch; and (c) line finder means connected to said multiplex highway and responsive to said allotter means for monitoring each free channel of said multiplex system, including seize detector means responsive to detection of supervisory signals in one of said free channels and means for locking said switching means in said selector switch selected by said allotter means onto said one free channel detected by said seize detector means.

24. A time division multiplex switching system as defined in claim 23 wherein said switching means in each selector switch comprises demultiplexing means connected to said input terminal for extracting said designated channel of information from said multiplex highway;

means for detecting the signals representative of dialing impulses in said designated channel received from said demultiplexing means;

multiplexing means responsive to said detecting means for connecting the output of said demultiplexing means to a selected output terminal identified by the detected signals representative of dialing impulses; and control means for actuating said multiplexing means during a selected time slot of said recurring time frame.

25. A time division multiplex switch as defined in claim 24, further including means connected between the output of said demultiplexing means and the input of said multiplexing means for stretching said designated channel of information to the full width of said time frame.

26. A time division multiplex switch as defined in claim 25 wherein said demultiplexing means comprises gating means for connecting said highway to said multiplexing means via said stretching means and means for actuating said gating means repetitively during the time slot of said recurring time frame assigned to said designated channel.

27. A time division multiplex switch as defined in claim 26 wherein said means for actuating said gating means is a counter.

28. A time division multiplex switching system as defined in claim 26 wherein said line finder means further includes input gate means connected to said multiplex highway and responsive to said allotter means for passing only supervisory signals from free channels, said seize detector means comprising a seize detector connected to the output of said input gate means and serving to operate said gating means in said demultiplexing means upon detection of supervisory signals in a free channel.

29. A time division multiplex switching system as defined in claim 28 wherein said actuating means in said demultiplexing means is a selectively actuatable counter providing an output at intervals equal to the width of said time frame.

30. A time division multiplex switching system as defined in claim 28, wherein said input gate means of said line finder means comprises an AND gate having a first input connected to said multiplex highway, a second input receiving timing signals occurring at the time period during which said supervisory signals for said designated channel are received and a third input receiving enabling signals from said allotter means during the time periods assigned to those free channels on the multiplex highway.

31. A time division multiplex switching system as defined in claim 23 wherein said allotter means comprises first storage means for storing the busy/free status of the channels of said multiplex system which are free in that they have not been carrying information signals and for providing an enabling signal to said line finder means during the time periods assigned to those free channels on the multiplex highway.

32. A time division multiplex switching system as defined in claim 31 wherein said allotter means further comprises second storage means for storing the busy/free status of said selector switches and for providing a signal identifying one free selector switch.

33. A time division multiplex system as defined in claim 32 wherein said allotter means further comprises distributor means responsive to said first and second storage means for connecting said line finder means to said selected selector switch.

34. A time division multiplex switching system as defined in claim 33 wherein said switching means in each selector switch comprises demultiplexing means connected to said input terminal for extracting said designated channel of information from said multiplex highway;

means for detecting the dialing impulses in said designated channel received from said demultiplexing means;

multiplexing means responsive to said detecting means for connecting the output of said demultiplexing means to a selected output terminal identified by the detected dialing impulses; and control means for actuating said multiplexing means during a selected time slot of said recurring time frame.

35. A time division multiplex switching system as defined in claim 34 wherein said line finder means further includes input gate means connected to said multiplex highway and responsive to said allotter means for passing only supervisory signals from free channels, said seize detector means comprising a seize detector connected to the output of said input gate means and serving to operate said gating means in said demultiplexing means upon detection of supervisory signals in a free channel.

36. A time division multiplex switching system as defined in claim 35 wherein said input gate means of said line finder means comprises an AND gate having a first input connected to said multiplex highway, a second input receiving timing signals occurring at the time period during which said supervisory signals for said designated channel are received and a third input receiving enabling signals from said allotter means during the time periods assigned to those free channels on the multiplex highway.

37. A time division multiplex switching system as defined in claim 36 wherein said seize detector is connected to said first and second storage means for marking busy the channel and selector switch which receives supervisory signals on that channel when the seize detector enables the demultiplexing means therein.

38. A time division multiplex switch as defined in claim 36 wherein said detecting means comprises gating means responsive to the output of said demultiplexing means and a timing signal occurring at the time period during which said supervisory signals for said designated channel are received for extracting said supervisory signals from said designated channel, impulse analyzer means responsive to said gating means for analyzing said supervisory signals and detecting dial pulses and interdigital pauses, and digital counter means responsive to said impulse analyzer means for counting dialing impulses until an interdigital pause is detected.

39. A time division multiplex switch as defined in claim 38 wherein said multiplexing means comprises a plurality of gates, each having its output connected to a respective one of said output terminals, one input of each of said gates being connected in common to the output of said demultiplexing means and a second input of each of said gates being connected to a respective digit output of said digital counter means.

40. A time division multiplex switch as defined in claim 39 wherein said control means comprises selectively settable time slot counter means connected in common to a third input of each of said plurality of gates forming said multiplexing means for enabling said gates during a selected time slot of said recurring time frame.

41. A time division multiplex switching system as defined in claim 25, further including a plurality of additional selector switches having a construction corresponding to said first-mentioned selector switches, each output terminal of each of said first-mentioned selector switches being connected in common to a respective group of said additional selector switches.

42. A time division multiplex switching system as defined in claim 25, further comprising a plurality of connector switches, each output terminal of each of said selector switches being connected to a respective group of said connector switches by a further time division multiplex highway, each connector switch comprising
- an input terminal connected to said multiplex highway from a selector switch and a plurality of output terminals;
- demultiplexing means connected to said input terminal for extracting said designated channel of information from said multiplex highway,
- means for detecting dialing impulses from said demultiplexing means;
- means for storing a pair of successively received digits detected by said detecting means; and
- matrix switching means responsive to said pair of digits in said storing means for connecting the output of said demultiplexing means to the one of said output terminals of the connector switch designated by said stored digits.

43. A time division multiplex switch as defined in claim 42, further including means connected between the output of said demultiplexing means and said matrix switching means for stretching said designated channel of information to the full width of said time frame.

44. A time division multiplex switch as defined in claim 43 wherein said demultiplexing means comprises gating means for connecting said highway to said multiplexing means via said stretching means and means for actuating said gating means repetitively during the time slot of said recurring time frame assigned to said designated channel.

45. A time division multiplex switch as defined in claim 44 wherein said means for actuating said gating means is a counter.

46. A time division multiplex switch as defined in claim 42 wherein said detecting means comprises gating means responsive to the output of said demultiplexing means and a timing signal occurring at the time period during which said supervisory signals for said designated channel are received for extracting said supervisory signals from said designated channel, impulse analyzer means responsive to said gating means for analyzing said supervisory signals and detecting dial pulses and interdigital pauses, and digital counter means responsive to said impulse analyzer means for counting dialing impulses until an interdigital pause is detected.

47. A time division multiplex switch as defined in claim 46 wherein said storing means comprises first and second registers responsive to said digital counter means and said impulse analyzer means for the respective digits of said pair of digits as they are sequentially detected.

48. A time division multiplex switch as defined in claim 47 wherein said matrix switching means comprises a coordinate array of crosspoint switches respectively connected to the crosspoints of a plurality of horizontal and vertical lines, said first and second registers controlling said horizontal and vertical lines, respectively, so that the pair of digits stored therein will actuate a single one of said crosspoint switches designated by said pair of digits.

49. A time division multiplex switching system as defined in claim 43, further including a plurality of additional selector switches having a construction corresponding to said first-mentioned selector switches, each output terminal of each of said first-mentioned selector switches being connected in common to a respective group of said additional selector switches, each output terminal of said additional selector switches being connected by said further multiplex highway to a respective group of said connector switches.

* * * * *